April 22, 1924.

G. FORNACA

SEGMENTAL BRAKE FOR THE STEERING WHEELS OF AUTOMOBILES AND THE LIKE

Filed Nov. 5, 1921

1,491,257

Guido Fornaca
Inventor
By Edwards, Sager & Bower,
Attorneys

Patented Apr. 22, 1924.

1,491,257

UNITED STATES PATENT OFFICE.

GUIDO FORNACA, OF TURIN, ITALY.

SEGMENTAL BRAKE FOR THE STEERING WHEELS OF AUTOMOBILES AND THE LIKE.

Application filed November 5, 1921. Serial No. 513,032.

*To all whom it may concern:*

Be it known that I, GUIDO FORNACA, engineer, a subject of the King of Italy, residing at Turin, in the Kingdom of Italy, have invented certain new and useful Improvements in and Connected with Segmental Brakes for the Steering Wheels of Automobiles and the like.

This invention relates to extensible segmental brakes of the steering road wheels of automobiles and the like, and particularly to a control arrangement for the brake segments.

The arrangement is more simple, sure and economical and is also stronger than those at present known, as it does not necessitate the employment of members such as a Cardan shaft for transmitting motion to the brake shoes. Furthermore the cost of my improved mechanism is not appreciably greater than that of the usual automobile brakes.

According to the preferred embodiment of my invention a cam for controlling the brake segments is secured directly to the control shaft which in turn is mounted to rotate in the steering wheel axle. The position of the cam relative to the steering wheel and its shaft are such as to permit of steering without in any way causing an opening or closing of the brake segments.

The cam has a form which is elongated in a direction at right angles to its own axis of rotation and when a brake is in released position the longer axis of the cam coincides with the axis of the steering pivot. The form of the cam is such that sections, perpendicular to the axis of the steering pivot and obtained by passing planes through the successive points of contact between the cam and the opposed surfaces of the segments, present circular arcs turned towards the said surfaces, the centre of the arcs corresponding with the point of intersection of the axis of the steering pivot with the said sectional planes, and the angular amplitude of the arcs being not less than the maximum turning of the wheel, so that no matter to what position the key is set, the wheel can be steered without affecting the degree of opening of the brake segments.

On the annexed drawings is shown diagrammatically, by way of example, one form of construction of the improved system of brakes for steering wheels of automobiles. On these drawings.

Figure 5:
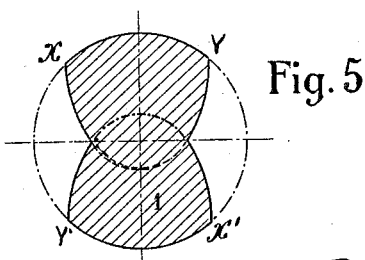
Fig. 5 is a section along the lines D O O' D' in Fig. 4.

The cam 1 is secured to the control counter shaft 2, and is disposed between the opposite faces 3 of the segments 4. Such segments are shown as capable of oscillating about pivot 4', Fig. 1, in the interior of a drum 5 rigidly secured to a wheel of the automobile. 7 designates the pivot of the wheel, and 8 the steering pivot.

Figure 2:
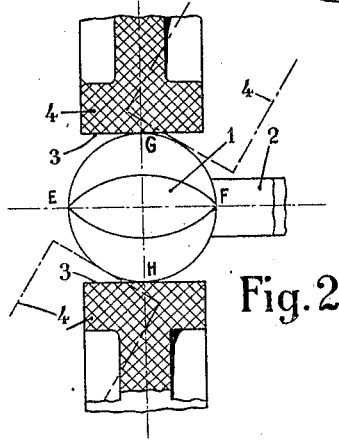
Figs. 2 and 3 are plan views on a larger scale of the cam and the segments respectively illustrating the brake in the extreme "off" and "on" position.
Figure 1:
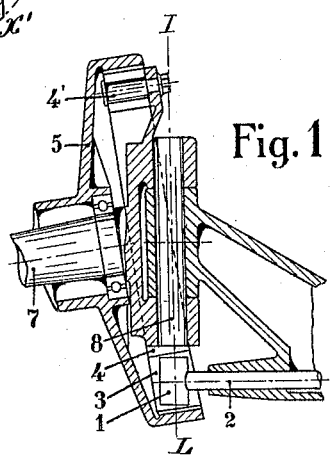
Fig. 1 shows the brake and relative control in axial transverse section.
Figure 3:
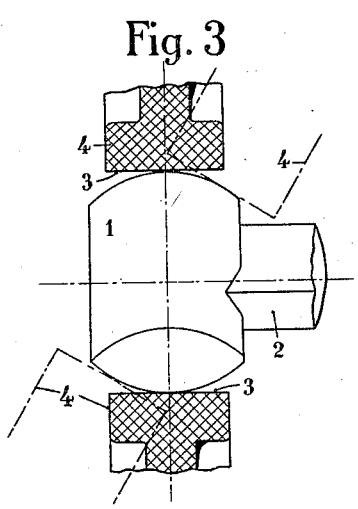
Figure 4:
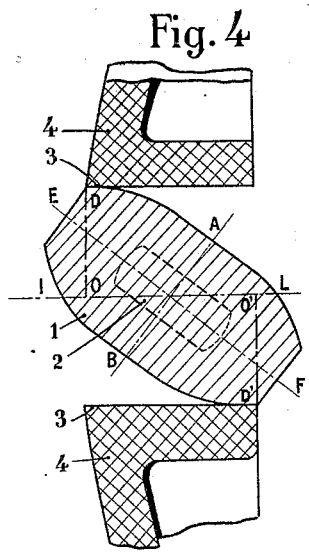
Fig. 4 is a view at right angles to Fig. 3.

The axis of the body of the cam 1 is in line with and corresponds to the axis I, L, of the steering pivot 8, when the cam is in the vertical position (Figs. 1 and 2). The contour of the cam is such, that the perpendicular sections to the axis I, L, of the steering pivot passing through the points of contact of the said cam with the opposed surfaces 3 of the segments, form arcs of a circle turned towards the said surfaces, having an angular amplitude not less than that of the maximum turning of the wheel, and the centre of which is situated at the axis of the steering pivot I, L, as shown in Figs. 4 and 5, where the circular arcs X, Y and X', Y', of equal radii, have their respective centres at O and O' at the point of intersection of the axis I, L, of the steering pivot with the planes of the corresponding sections.

Other sections, for different positions of the cam, obtained in a like manner through points of contact of the cam and segments and perpendicular to the axis of the steering pivot present the same characteristic circular arcs with their centers at the axis of the steering pivot. This ensures an invariable opening and closing of the brake segments during steering, because the opposed surfaces of the segments move about the circular arcs with their centres always at the axis of the steering pivot.

It is only when the cam is in the position shown in Fig. 2, that the sections perpendicular to the axis of the steering pivot and passing through the points of contact between the cam and the opposed surfaces 3 of the segments, correspond to and are in a single plane in the form of a circle.

Having now particularly described and ascertained the nature of my said invention and in what manner the same is to be performed, I declare that what I claim is:—

1. The combination with an axle, of a steering road wheel connected to the same, a brake for said wheel arranged to follow the steering movements thereof, an operating member for said brake which is independent of said steering movements, said member having an operating surface adapted for movable contact with said brake and means for moving said member to operate said brake, said member being so formed and arranged that the paths of movement of the contacting portions of said member and brake as the road wheel moves to steer are concentric to the axis of the steering movement for any position of said brake.

2. The combination with an axle, of a steering road wheel connected to the same, a brake for said wheel arranged to follow the steering movements thereof, an operating member for said brake which is independent of the steering movements of said wheel, said member having an operating surface adapted for movable contact with said brake, and means for moving said member to operate said brake, said member being formed with a substantially cylindrical central portion arranged to bear against said brake when the same is in released position and curved end portions, the parts being so formed and arranged that the paths of movement of the contacting portions of said member and brake are always concentric to the axis of steering movement of said wheel.

3. The combination with an axle, of a steering road wheel connected to the same, a drum movable with said wheel, a member carried by said axle, a pair of brake shoes pivoted to said member, a cam for operating said brake shoes pivoted to said axle and being formed with a cylindrical surface at right angles to its axis of rotation and against which said shoes are adapted to bear when in released position, said cam also being formed with end surfaces of less transverse curvature than said cylindrical surfaces, the parts being so constructed and arranged that steering movement may be imparted to said wheel while said cam is in any of its operative positions without imparting operative movement to said shoes.

In witness whereof, I have hereunto signed my name in the presence of two subscribing witnesses.

ING. GUIDO FORNACA.

Witnesses:
  HENRIETTA DELFORME,
  UMBERTO FRANCESCONI.